US008724855B2

United States Patent
Kim

(10) Patent No.: US 8,724,855 B2
(45) Date of Patent: May 13, 2014

(54) BIOMETRIC INFORMATION MEASUREMENT APPARATUS AND METHOD USING USER TERMINAL

(75) Inventor: Dong-Kyoo Kim, Yeongi-gun (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 148 days.

(21) Appl. No.: 13/324,672

(22) Filed: Dec. 13, 2011

(65) Prior Publication Data

US 2012/0155716 A1     Jun. 21, 2012

(30) Foreign Application Priority Data

Dec. 16, 2010  (KR) ................. 10-2010-0129326

(51) Int. Cl.
*G06K 9/00* (2006.01)
(52) U.S. Cl.
USPC ............ 382/115; 382/124; 382/125; 382/218
(58) Field of Classification Search
USPC ..................... 382/115, 124, 218, 117, 125
See application file for complete search history.

(56) References Cited

U.S. PATENT DOCUMENTS

| | | | |
|---|---|---|---|
| 5,483,601 A * | 1/1996 | Faulkner ...................... | 382/115 |
| 7,212,279 B1 * | 5/2007 | Feng .............................. | 356/71 |
| 7,417,727 B2 * | 8/2008 | Polonskiy et al. ............ | 356/300 |
| 7,486,977 B2 * | 2/2009 | Sweitzer et al. .............. | 600/323 |
| 8,308,641 B2 * | 11/2012 | Moroney et al. .............. | 600/301 |
| 2003/0071119 A1 * | 4/2003 | Tsikos et al. .................. | 235/434 |
| 2004/0003295 A1 * | 1/2004 | Elderfield et al. ............ | 713/202 |
| 2006/0088193 A1 * | 4/2006 | Muller et al. ................. | 382/117 |
| 2007/0100218 A1 * | 5/2007 | Sweitzer et al. .............. | 600/323 |
| 2008/0107309 A1 * | 5/2008 | Cerni ............................ | 382/115 |

FOREIGN PATENT DOCUMENTS

| KR | 1020040027495 A | 4/2004 |
|---|---|---|
| KR | 1020080065985 A | 7/2008 |

* cited by examiner

*Primary Examiner* — Amir Alavi
*Assistant Examiner* — Aklilu Woldemariam

(57) ABSTRACT

Disclosed herein is a biometric information measurement apparatus using a user terminal. The biometric information measurement apparatus includes a light-emitting control unit, a camera, an image analysis unit, and a biometric information measurement unit. The light-emitting control unit controls the output of an optical signal from at least one light emitting element which outputs the optical signal to a part of a body of a user. The camera is to be placed to face the part of the body, and configured to capture light generated in such a way that the optical signal passes through the part of the body or the optical signal is reflected off of the part of the body. The image analysis unit analyzes an image captured using the camera. The biometric information measurement unit measures biometric information about the user based on the results of the image analysis.

6 Claims, 8 Drawing Sheets

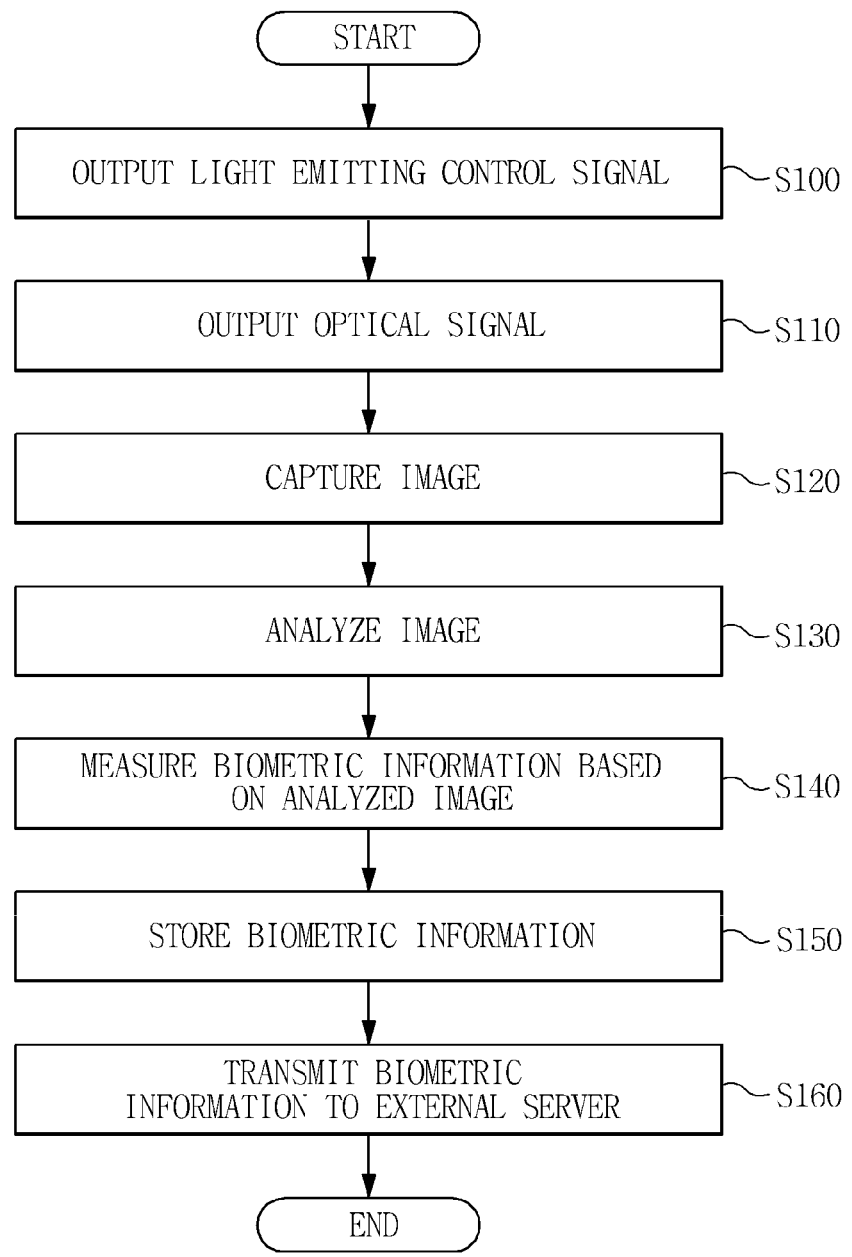

BIOMETRIC INFORMATION MEASUREMENT APPARATUS AND METHOD USING USER TERMINAL

CROSS REFERENCE TO RELATED APPLICATION

This application claims the benefit of Korean Patent Application No. 10-2010-0129326, filed on Dec. 16, 2010, which is hereby incorporated by reference in its entirety into this application.

BACKGROUND OF THE INVENTION

1. Technical Field

The present invention relates generally to a biometric information measurement apparatus and method using a user terminal, and, more particularly, to a biometric information measurement apparatus and method using a user terminal, which enables biometric signals, such as oxygen saturation, a pulse, and the degree of muscle activity, to be freely measured regardless of places, using a user terminal.

2. Description of the Related Art

In the prior art, software used to measure biometric information using light emitting elements and photodiodes or using natural light and the camera of a mobile terminal has been used.

However, when biometric information is measured using light emitting elements and photodiodes, it is inconvenient to use them because a separate apparatus in which light emitting elements and photodiodes are provided should be attached to a human body.

Further, when biometric information is measured using natural light and the camera of a mobile phone, there is a problem of the reliability of collected biometric signals being less because natural light is used and the amount of light from a light source is not uniform. It is apparent that biometric information may be measured in such a way as to provide light emitting elements and photodiodes on a mobile terminal. However, since light emitting elements and photodiodes should be provided in a manufacturing process, there is a problem in that they cannot be applied to mobile terminals which had been manufactured before.

SUMMARY OF THE INVENTION

Accordingly, the present invention has been made keeping in mind the above problems occurring in the prior art, and an object of the present invention is to provide a biometric information measurement apparatus and method using a user terminal, which enables biometric information, such as a pulse, oxygen saturation, and the degree of muscle activity, to be measured using the camera of an existing user terminal.

Another object of the present invention is to provide a biometric information measurement apparatus and method using a user terminal, which measures biometric information using one or more stable light sources, thereby improving the reliability of the collected biometric information.

In order to accomplish the above objects, the present invention provides a biometric information measurement apparatus using a user terminal, including: a light-emitting control unit configured to control output of an optical signal from at least one light emitting element which outputs the optical signal to a part of a body of a user; a camera which is to be placed to face the part of the body, and configured to capture light generated as a result that the optical signal passes through the part of the body or the optical signal is reflected off of the part of the body; an image analysis unit configured to analyze an image captured using the camera; and a biometric information measurement unit configured to measure biometric information about the user based on a result of the image analysis.

The biometric information measurement unit may measure at least one of blood oxygen saturation, a pulse, and muscle activity information of the user.

The biometric information measurement unit may measure the blood oxygen saturation from the image based on information about a hemoglobin density according to the properties of light in the state in which the optical signal passed through blood vessels of the part of the body.

The biometric information measurement unit may measure a degree of muscle activity using variation in light transmittance attributable to the swelling and reduction of the muscle based on the image.

The light emitting element may be fixed to a holder which can be mounted on the main body of the user terminal, and may be arranged at a location corresponding to the camera provided in the user terminal such that the light emitting element faces the camera.

The light emitting element may be fixed to a holder which can be mounted on the main body of the user terminal, and may be arranged such that the light emitting element faces a direction which is the same as a direction in which the camera provided in the user terminal captures the image.

The image analysis unit may analyze at least one of brightness, pattern, light transmittance, and variation in light transmittance of an area, in which light was captured, of the captured image.

The biometric information measurement apparatus may further include an interface unit connected to the light emitting element in a wired or wireless manner, and may output a light-emitting control signal from the light-emitting control unit to the light emitting element.

In order to accomplish the above objects, the present invention provides a biometric information measurement method using a user terminal, including controlling output of an optical signal from at least one light emitting element which outputs the optical signal to a part of a body of a user; capturing light, generated as a result that the optical signal passes through the part of the body or the optical signal is reflected off of the part of the body, using a camera which is to be placed to face the part of the body; analyzing an image captured using the camera; and measuring biometric information about the user based on the results of the image analysis.

The measuring the biometric information may include measuring at least one of blood oxygen saturation, a pulse, and muscle activity information of the user.

The measuring the biometric information may include measuring the blood oxygen saturation from the image based on information about a hemoglobin density according to the properties of light in the state in which the optical signal passed through the blood vessels of the part of the body.

The measuring the biometric information may include measuring the degree of muscle activity using a variation in light transmittance attributable to the swelling and reduction of the muscle based on the image.

The analyzing the image may include analyzing at least one of brightness, pattern, light transmittance, and variation in light transmittance of an area, in which light was captured, of the captured image.

The controlling the output of the optical signal may include outputting a light-emitting control signal, used to control the output of the optical signal from the light emitting element, to the light emitting element in a wired or wireless manner.

BRIEF DESCRIPTION OF THE DRAWINGS

The above and other objects, features and advantages of the present invention will be more clearly understood from the following detailed description taken in conjunction with the accompanying drawings, in which:

FIG. 9 is a flowchart illustrating the operational flow of a biometric information measurement method using a user terminal according to the present invention.

DESCRIPTION OF THE PREFERRED EMBODIMENTS

Embodiments of the present invention will be described with reference to the accompanying drawings below.

Figure 1:
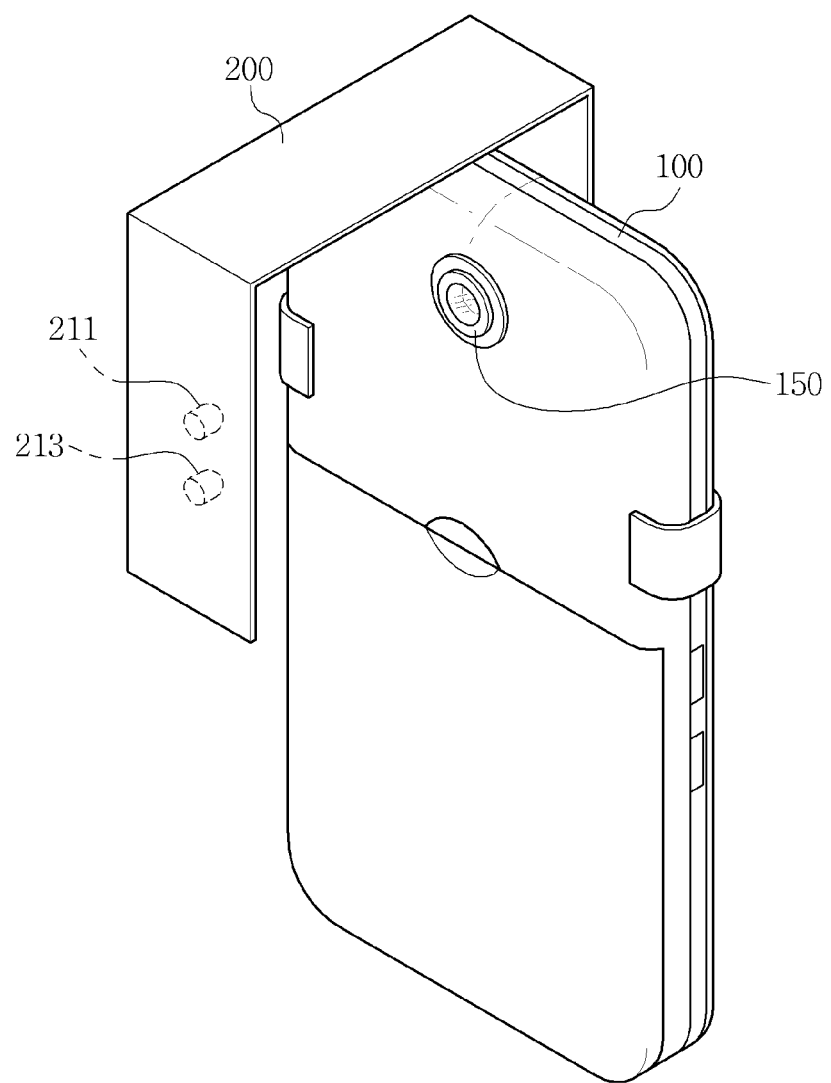
FIG. 1 is a view illustrating a biometric information measurement apparatus using a user terminal according to the present invention.

FIG. 1 is a view illustrating a biometric information measurement apparatus using a user terminal according to the present invention.

As shown in FIG. 1, the biometric information measurement apparatus using a user terminal according to the present invention (hereinafter referred to as a tiometric information measurement apparatus') includes a user terminal 100 and one or more light emitting elements 211 and 213 used to project light on the body of a user. Here, the user terminal 100 is provided with image capture means, that is, a camera 150, for capturing one or more biometric information measurement images. Here, the user terminal 100 may include a mobile communication terminal.

Further, the light emitting elements 211 and 213 are provided in a holder 200 which can be mounted on the user terminal 100. Here, when the holder 200 is mounted on the user terminal 100, the light emitting elements 211 and 213 are provided at locations corresponding to the camera 150 of the user terminal 100. Here, the light emitting elements 211 and 213 are provided in the holder 200 such that the light emitting elements 211 and 213 face the camera 150 of the user terminal 100.

In the embodiment of the present invention, it is assumed that two light emitting elements 211 and 213 are provided in the holder 200. Here, it is assumed that one light emitting element 211 is a red-colored light emitting element and the other light emitting element 213 is an infrared light emitting element. Further, although not shown in the embodiment of the present invention, a battery may be equipped in the holder 200 in order to drive the light emitting elements 211 and 213.

Meanwhile, the holder 200 may be mounted on the user terminal 100 in various forms. Embodiments illustrating the holder 200 will be described with reference to FIGS. 2 and 3.

Figure 2:
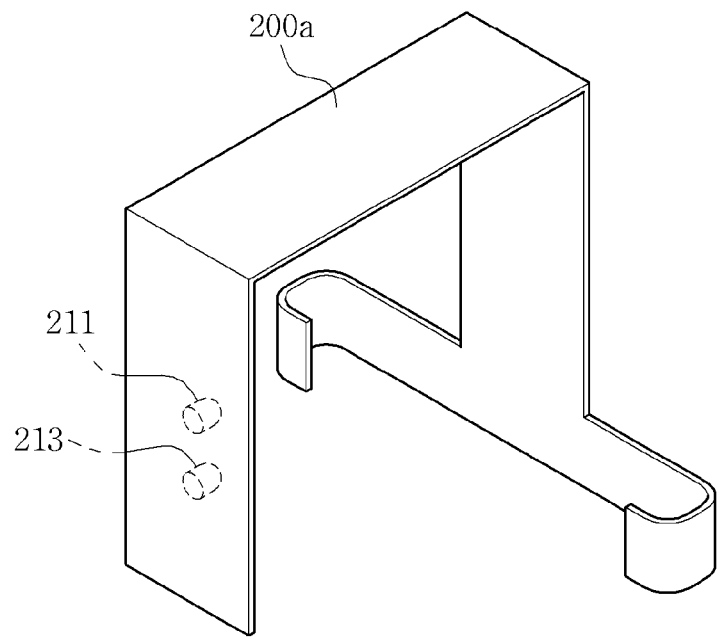
FIGS. 2 and 3 are views illustrating embodiments respectively showing light emitting units which are applied to the biometric information measurement apparatus using a user terminal according to the present invention.
Figure 3:
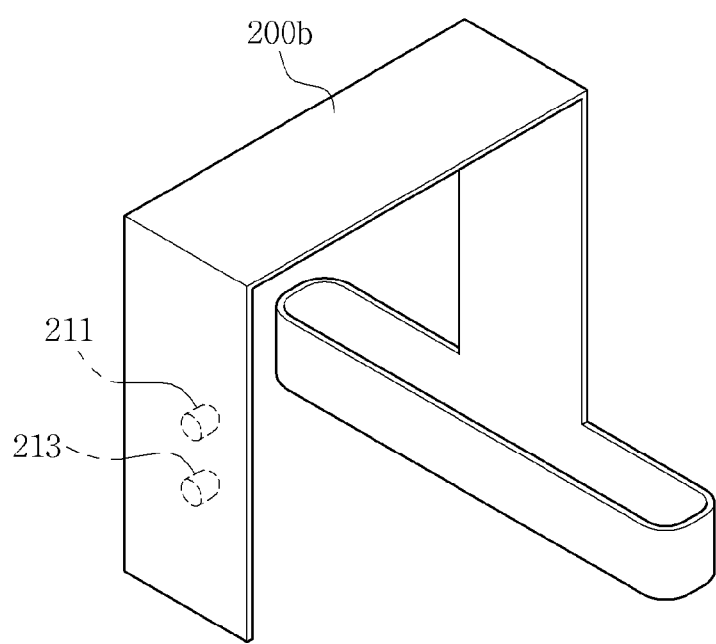

FIGS. 2 and 3 are views illustrating embodiments respectively showing light emitting units which are applied to the biometric information measurement apparatus using a user terminal according to the present invention.

The holder 200a shown in FIG. 2 is configured to be fixed to the user terminal 100 on both sides of the user terminal 100. The holder 200b shown in FIG. 3 is configured to be fixed to the entire body of the user terminal 100 from the top to the bottom.

It is apparent that FIGS. 2 and 3 only correspond to embodiments and other types of holders, which may be hung on the user terminal 100, can be used.

Figure 4:
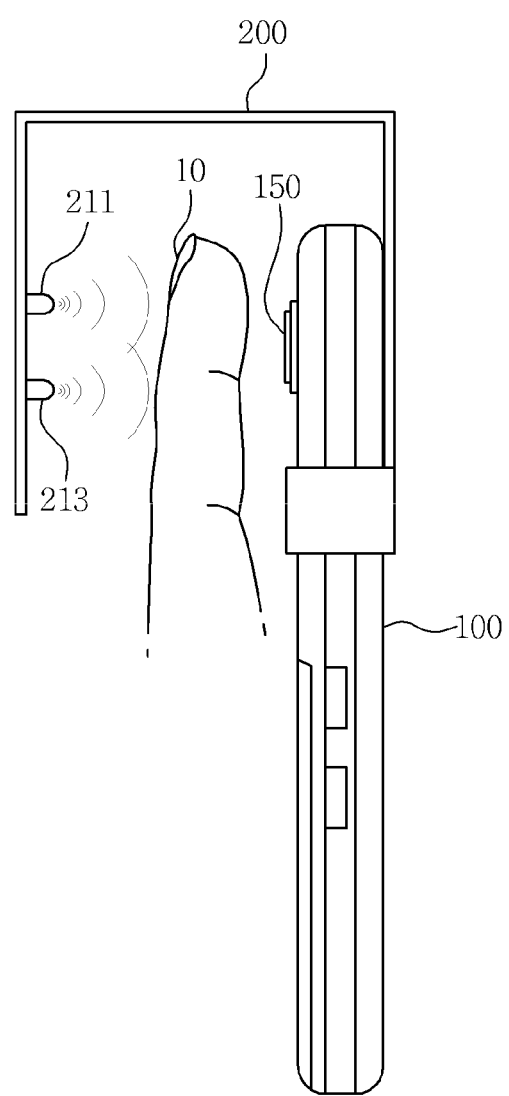
FIG. 4 is a view illustrating the operation of the biometric information measurement apparatus using a user terminal according to the present invention.

FIG. 4 is a view illustrating the operation of the biometric information measurement apparatus using a user terminal according to the present invention.

As shown in FIG. 4, a user places a part of the body of the user between the camera 150 of the user terminal 100 and the light emitting elements 211 and 213 in order to measure biometric information. Here, the direction in which the part of the body of the user is placed between the camera 150 and the light emitting elements 211 and 213 is not limited to a predetermined single direction. The embodiment of FIG. 4 shows an example in which a finger of the user is placed between the camera 150 and the light emitting elements 211 and 213.

When optical signals are output from the light emitting elements 211 and 213, the user terminal 100 allows the camera 150 to capture light that has passed through the body of the user.

Therefore, the user terminal 100 obtains an image used to measure biometric information about the corresponding user from the camera 150, and then obtains the biometric information by analyzing the characteristics of the obtained image.

Figure 5:
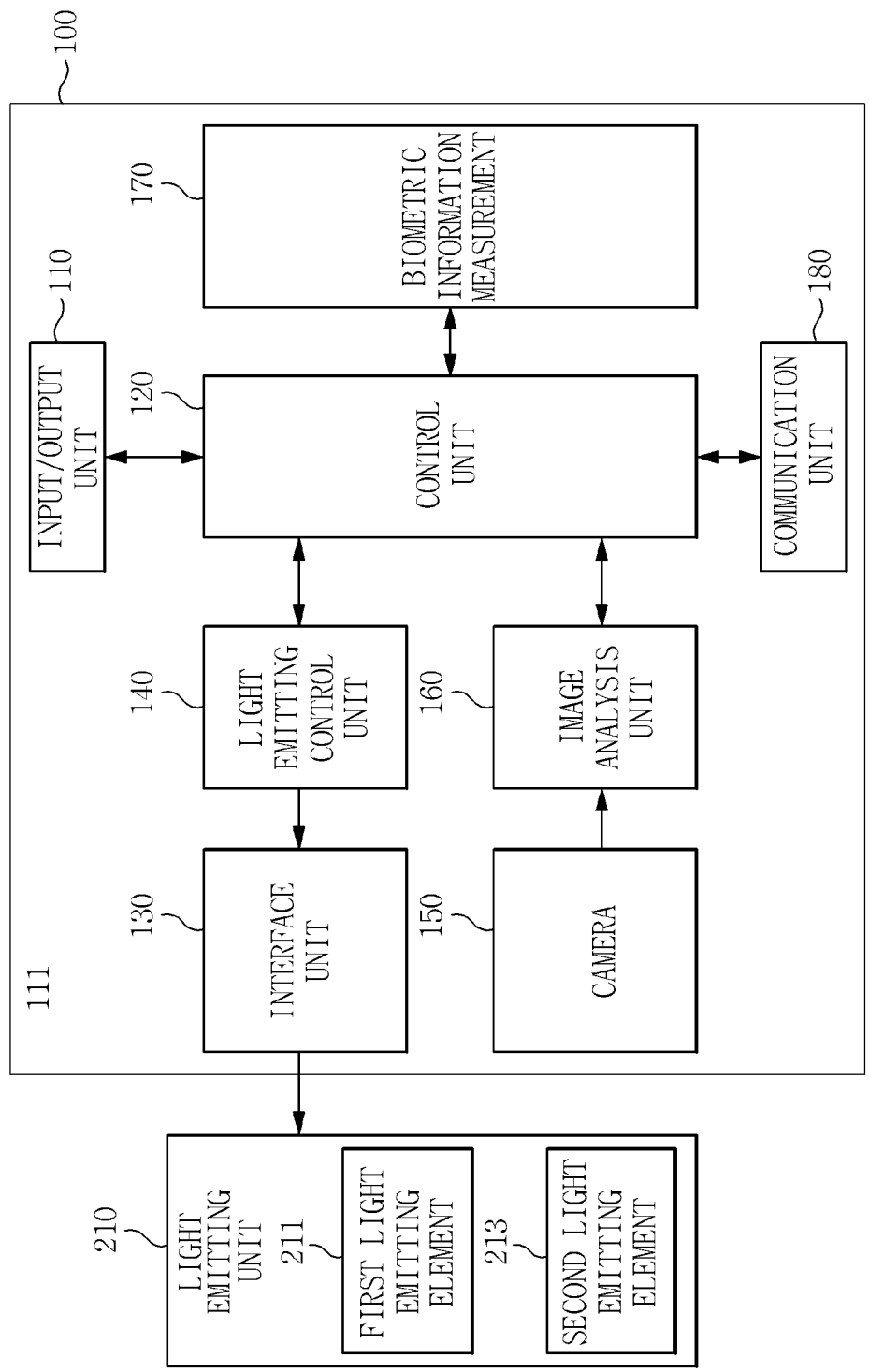
FIG. 5 is a block diagram illustrating the configuration of the biometric information measurement apparatus using a user terminal according to the present invention.

FIG. 5 is a block diagram illustrating the configuration of the biometric information measurement apparatus using a user terminal according to the present invention.

As shown in FIG. 5, the user terminal 100 includes an input/output unit 110, a control unit 120, an interface unit 130, a light emitting control unit 140, a camera 150, an image analysis unit 160, a biometric information measurement unit 170, and a communication unit 180.

Meanwhile, a light emitting unit 210 which is provided in the holder 200 includes a first light emitting element 211 and a second light emitting element 213. Here, it is assumed that the first light emitting element 211 is a red-colored light emitting element and the second light emitting element 213 is an infrared light emitting element. It is apparent that other types of light emitting elements may be used according to an embodiment.

The input/output unit 110 receives a specific control command from a user, and then outputs the operation of the biometric information measurement apparatus and the results of the measurement of the biometric information.

The control unit 120 controls the operations of the respective units of the biometric information measurement apparatus. Further, when a control command used to measure biometric information is received from the input/output unit 110, the control unit 120 outputs a control signal to the light emitting control unit 140.

The light emitting control unit 140 outputs a light-emitting control signal used to control the external light emitting elements 211 and 213 in response to the control signal from the control unit 120. Here, the light-emitting control signal includes control information, such as output strength, corresponding to the external light emitting elements 211 and 213.

The interface unit 130 transmits the light-emitting control signal from the light emitting control unit 140 to the external light emitting elements 211 and 213. Therefore, the external light emitting elements 211 and 213 output light in response to the light-emitting control signal received from the interface unit 130.

Here, the interface unit 130 transmits the light-emitting control signal to the external light emitting elements 211 and 213 in a wired or wireless manner. In the case of the wired manner, a line used to transmit and receive a signal may be connected to the inside or outside of the holder. Here, one end of the connection line may be connected to the light emitting elements 211 and 213, and the other end of the connection line may be connected to the interface unit 130 by the connector (not shown) of the user terminal 100. Meanwhile, in the case of the wireless manner, a wireless interface may be provided inside of the holder 200, the wireless interface being used to perform wireless communication with the interface unit 130.

The camera 150 captures an image when light signals are output by the external light emitting elements 211 and 213. Here, the camera 150 captures light which passed through the body of the user in the state in which the part of the body of the user was placed between the camera 150 and the external light emitting elements 211 and 213. The camera 150 outputs the captured image to the image analysis unit 160.

The image analysis unit 160 analyzes the image captured using the camera 150. Here, the image analysis unit 160 analyzes the brightness, pattern, light transmittance and variation in the light transmittance of an area, in which light was captured, of the captured image. The image analysis unit 160 outputs the results of image analysis to the control unit 120.

When the image analysis results are received from the image analysis unit 160, the control unit 120 outputs a control signal to the biometric information measurement unit 170 together with the results of image analysis.

The biometric information measurement unit 170 performs a biometric information measurement operation in response to the control signal from the control unit 120. Here, the biometric information measurement unit 170 measures biometric information, that is, oxygen saturation, a pulse and the degree of muscle activity, based on the results of image analysis with respect to the image captured using the camera 150.

First, the biometric information measurement unit 170 measures oxygen saturation based on the image captured in the state in which the optical signals, output from the light emitting elements 211 and 213, passed through the blood vessels of the body. Here, the biometric information measurement unit 170 measures blood oxygen saturation in such a way as to measure the density of hemoglobin according to the characteristics of light based on the corresponding image.

Further, the biometric information measurement unit 170 measures a pulse based on the image captured using the camera 150. Further, the biometric information measurement unit 170 measures the degree of muscle activity using variation in light transmittance which is attributable to the swelling and reduction of muscle based on the image captured using the camera 150.

The communication unit 180 transmits and receives a signal to and from an external server. Here, the communication unit 180 transmits the results of biometric information measurement, performed using the biometric information measurement unit 170, to the external server based on the control command from the control unit 120. Meanwhile, the communication unit 180 may transmit both the image, captured using the camera 150, and the results of image analysis, performed using the image analysis unit 160, to the external server based on the control command from the control unit 120.

Figure 6:
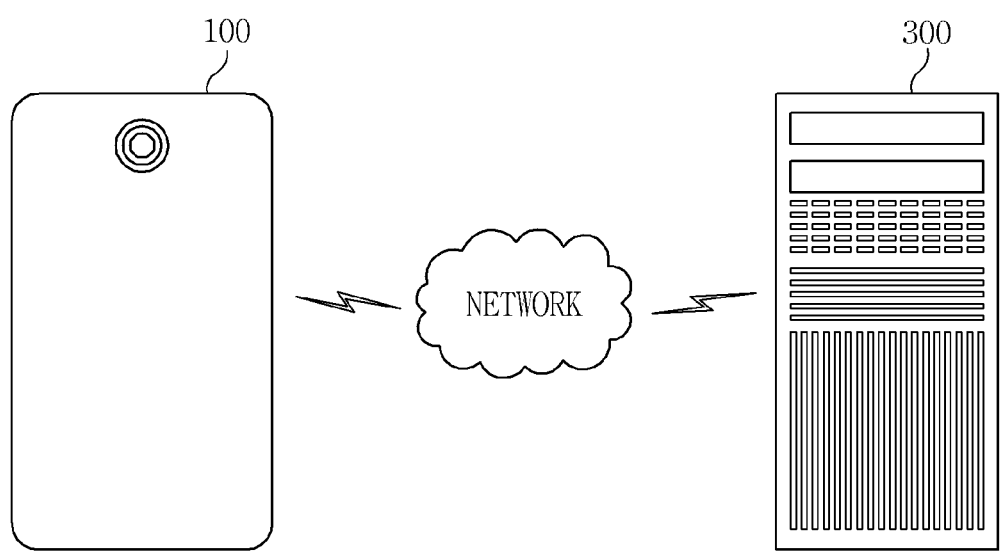
FIG. 6 is a view illustrating the configuration of a system to which the biometric information measurement apparatus using a user terminal according to the present invention is applied.

FIG. 6 is a view illustrating the configuration of a system to which the biometric information measurement apparatus using a user terminal according to the present invention is applied.

As shown in FIG. 6, the biometric information measurement apparatus according to the present invention may communicate with an external server 300 using the communication function of the user terminal 100.

That is, the user terminal 100 transmits the results of the biometric information measurement based on the captured image to the external server 300, so that the biometric information of the user can be managed using the external server 300.

Meanwhile, when the external server 300 is provided with the function of measuring biometric information, the image captured using the camera 150 and the results of image analysis may be directly transmitted to the external server 300. Here, the external server 300 may measure biometric information about the user based on an image received from the user terminal 100 and the results of image analysis.

Figure 7:
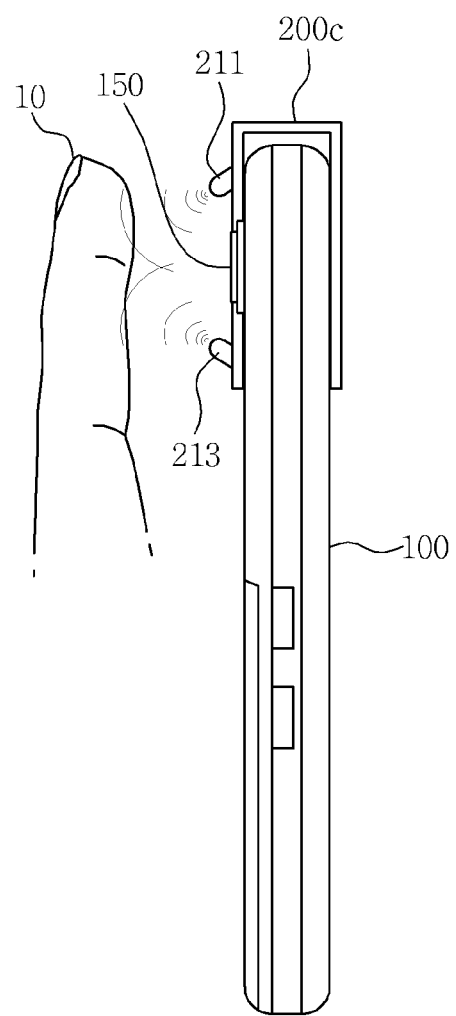
FIGS. 7 and 8 are views each illustrating further another embodiment showing a biometric information measurement apparatus using a user terminal according to the present invention.
Figure 8:
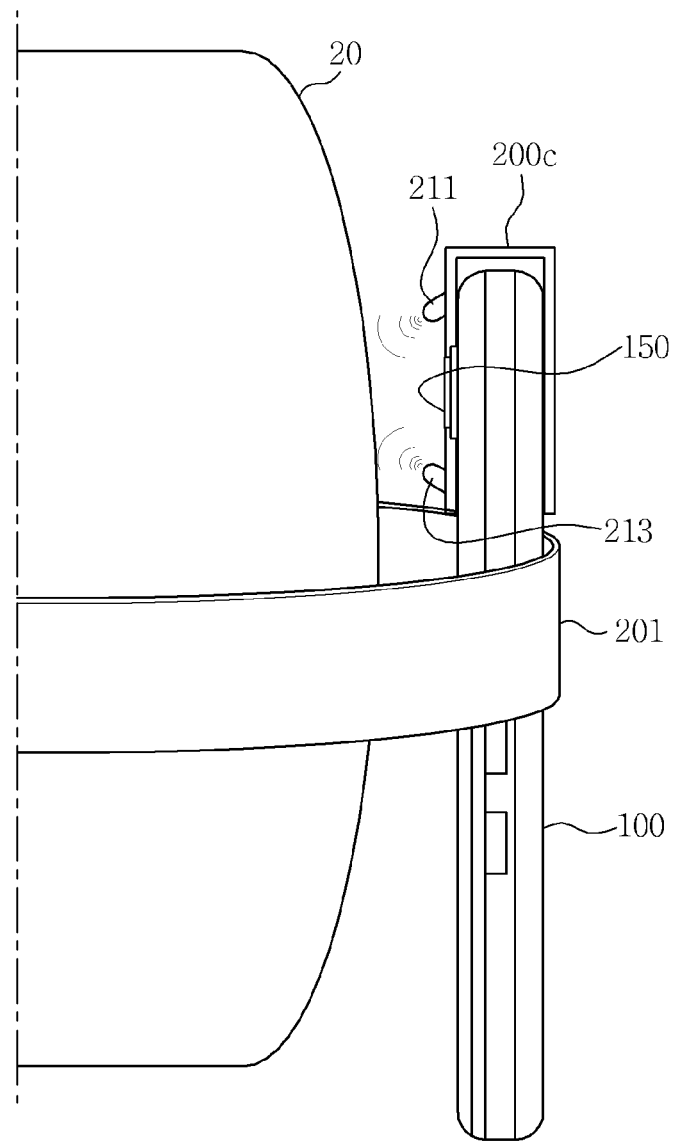

FIGS. 7 and 8 are views each illustrating further another embodiment showing a biometric information measurement apparatus using a user terminal according to the present invention.

The direction in which the light emitting elements of the holder are arranged in FIGS. 7 and 8 is different from the direction in FIGS. 1 to 4. That is, the light emitting elements 211 and 213 shown in FIGS. 1 to 4 are placed such that they face the camera 150 of the user terminal 100 but the light emitting elements 211 and 213 shown in the embodiments of FIGS. 7 and 8 are placed such that they face a direction which is the same as a direction in which the camera 150 captures an image.

In this case, if the camera 150 of the user terminal 100 faces a part of the body of the user, the light emitting elements 211 and 213 also output optical signals to the part of the body of the user that the camera 150 is facing. Here, the camera 150 captures optical signals which were output to the part of the body of the user and then reflected therefrom, thereby obtaining an image used to measure biometric information about the user.

Meanwhile, an embodiment of FIG. 8 is provided to measure biometric information about parts of the body which are wide or thick, such as the stomach 20 of the user. In the embodiment of FIG. 8, a separate belt 201 is provided to fix the user terminal 100 to the part of the corresponding body.

Here, the user terminal is fixed in such a way that the provided belt 201 surrounds the body of the user, so that the camera 150 of the user terminal 100 and the light emitting elements 211 and 213 of a holder 200c face the part of the body in which biometric information will be measured.

FIG. 9 is a flowchart illustrating the operational flow of a biometric information measurement method using a user terminal according to the present invention.

As shown in FIG. 9, when a part of the body of the user is placed in front of the camera 150, the biometric information measurement apparatus outputs a light-emitting control signal to the light emitting elements 211 and 213 at step S100 such that optical signals are output to the part of the body of the user at step S110.

Here, the biometric information measurement apparatus captures light which passed through the part of the body of the user or which was reflected off of the part of the body using the camera 150 at step S120, and then analyzes the image, captured at step S120, at step S130.

Here, the biometric information measurement apparatus analyzes the brightness, pattern, light transmittance, and variation in light transmittance of an area, in which light was captured, based on the image captured using the camera 150.

The biometric information measurement apparatus measures biometric information about the user based on the results of image analysis, obtained at step S130, at step S140. In detail, the biometric information measurement apparatus measures the blood oxygen saturation, pulse, and degree of muscle activity of the user. The biometric information measured at step S140 is stored in the biometric information measurement apparatus at step S150.

Further, the biometric information measurement apparatus may transmit the biometric information, measured at step S140, to the external server 300 if necessary at steps S160.

According to the present invention, biometric information, such as a pulse, oxygen saturation, and the degree of muscle activity, is measured using the camera of an existing user terminal, so that there is an advantage of increasing the convenience for a user.

Further, the present invention enables biometric information to be measured using stable light sources, so that there is an advantage of improving the reliability of collected biometric information.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A biometric information measurement apparatus using a user terminal, comprising:
   a light-emitting control unit configured to control at least one light emitting element which is configured to output an optical signal to a part of a body of a user;
   a camera which is to be placed in a position facing the part of the body, and configured to capture an image generated as a result of the optical signal passing through the part of the body or the optical signal being reflected off of the part of the body;
   an image analysis unit configured to analyze the image captured using the camera;
   and a biometric information measurement unit configured to measure biometric information about the user based on a result of the image analysis,
   wherein the biometric information measurement unit measures at least one of blood oxygen saturation, a pulse, and muscle activity information of the user,
   wherein the biometric information measurement unit measures the blood oxygen saturation from the image based on information about a hemoglobin density according to properties of light in a state in which the optical signal passed through blood vessels of the part of the body, wherein the biometric information measurement unit measures a degree of muscle activity using a variation in light transmittance attributable to swelling and reduction of muscle based on the image, and wherein the image analysis unit analyzes at least one selected from a brightness, a pattern, a light transmittance, and a variation in light transmittance of the captured image.

2. The biometric information measurement apparatus as set forth in claim 1, wherein the light emitting element is fixed to a holder which is configured to be mounted on a main body of the user terminal and arranged at a location corresponding to the camera provided in the user terminal such that the light emitting element faces the camera.

3. The biometric information measurement apparatus as set forth in claim 1, wherein the light emitting element is fixed to a holder which is configured to be mounted on a main body of the user terminal and arranged such that the light emitting element faces the same direction as a direction in which the camera provided in the user terminal captures the image.

4. The biometric information measurement apparatus as set forth in claim 1, further comprising an interface unit connected to the light emitting element in a wired or wireless manner, and configured to output a light-emitting control signal from the light-emitting control unit to the light emitting element.

5. A biometric information measurement method using a user terminal, comprising:
   controlling at least one light emitting element configured to output an optical signal to a part of a body of a user;
   capturing an image, generated as a result of the optical signal passing through the part of the body or the optical signal being reflected off of the part of the body, using a camera which is placed in a position facing the part of the body;
   analyzing the image captured using the camera; and
   measuring biometric information about the user based on a result of the image analysis, wherein the measuring the biometric information comprises measuring at least one of blood oxygen saturation, a pulse, and muscle activity information of the user,
   wherein the measuring the biometric information comprises measuring the blood oxygen saturation from the image based on information about a hemoglobin density according to properties of light in a state in which the optical signal passed through blood vessels of the part of the body,
   wherein the measuring the biometric information comprises measuring a degree of muscle activity using a variation in light transmittance attributable to swelling and reduction of muscle based on the image, and wherein the analyzing the image comprises analyzing at least one selected from a brightness, a pattern, a light transmittance and a variation in light transmittance of the captured image.

6. The biometric information measurement method as set forth in claim 5, wherein the controlling the light emitting element comprises sending a light-emitting control signal, used to control output of the optical signal from the light emitting element, to the light emitting element in a wired or wireless manner.

* * * * *